Feb. 24, 1931.  H. W. ALDEN  1,794,099
MOTOR VEHICLE
Filed Sept. 21, 1928   3 Sheets-Sheet 1
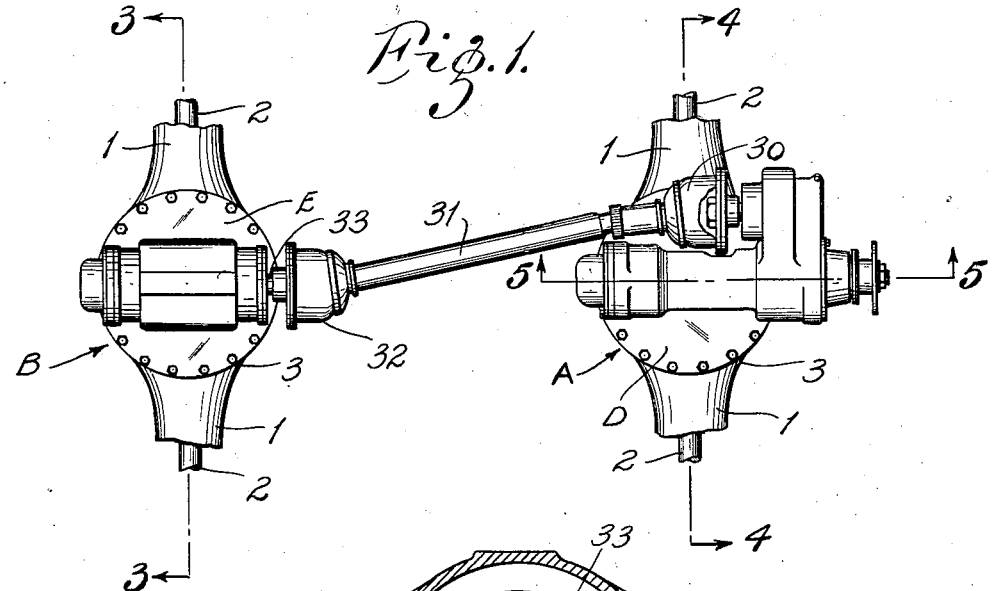
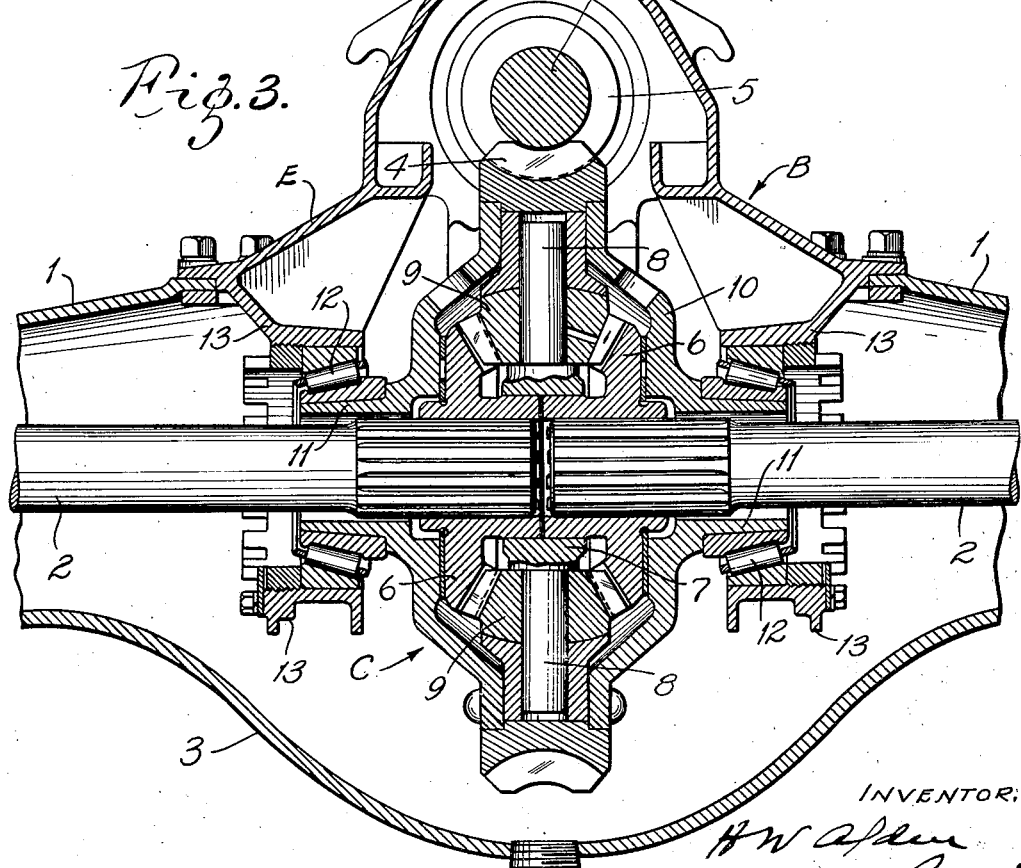
INVENTOR:
H W Alden
HIS ATTORNEYS.

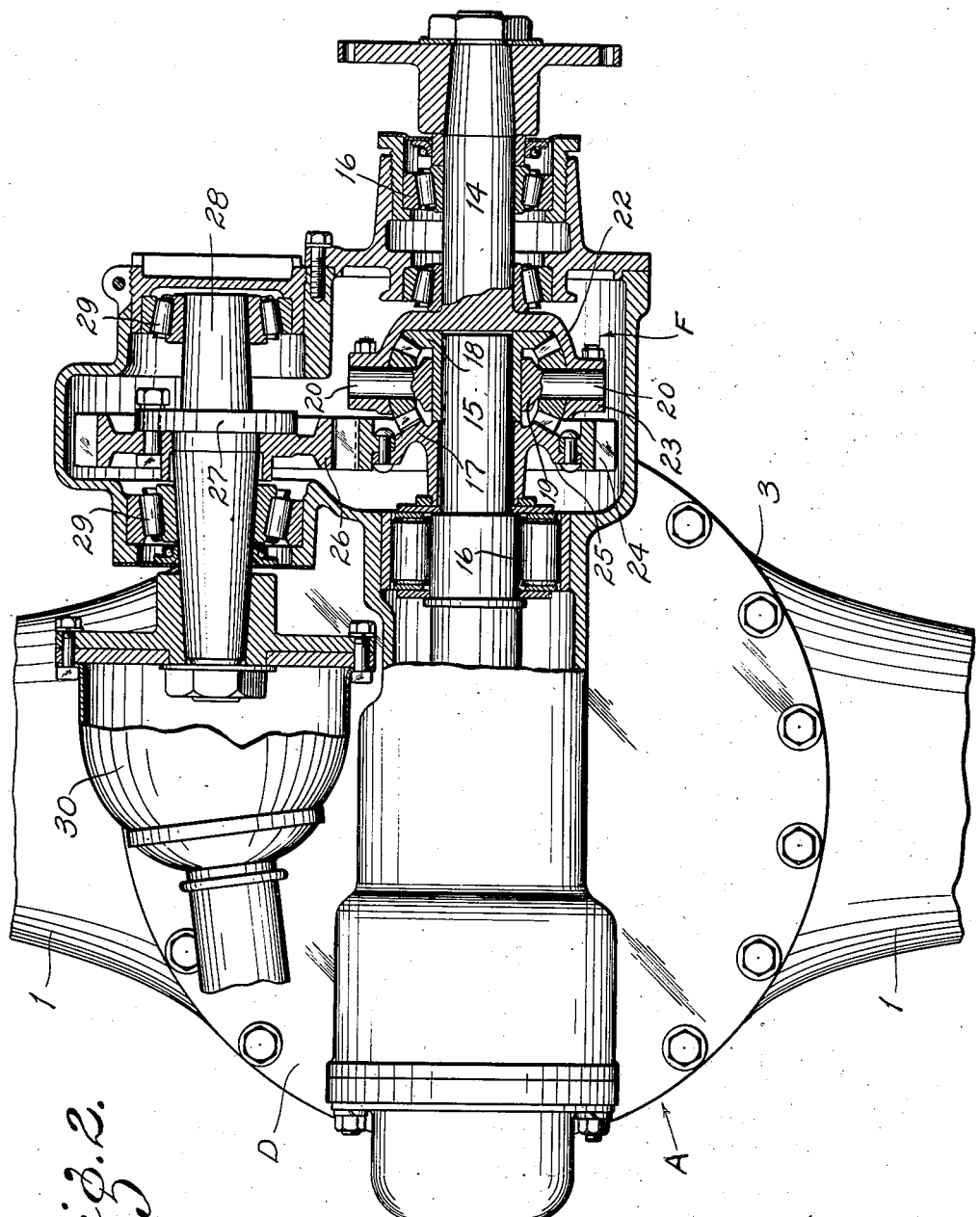

Feb. 24, 1931. H. W. ALDEN 1,794,099
MOTOR VEHICLE
Filed Sept. 21, 1928   3 Sheets-Sheet 3
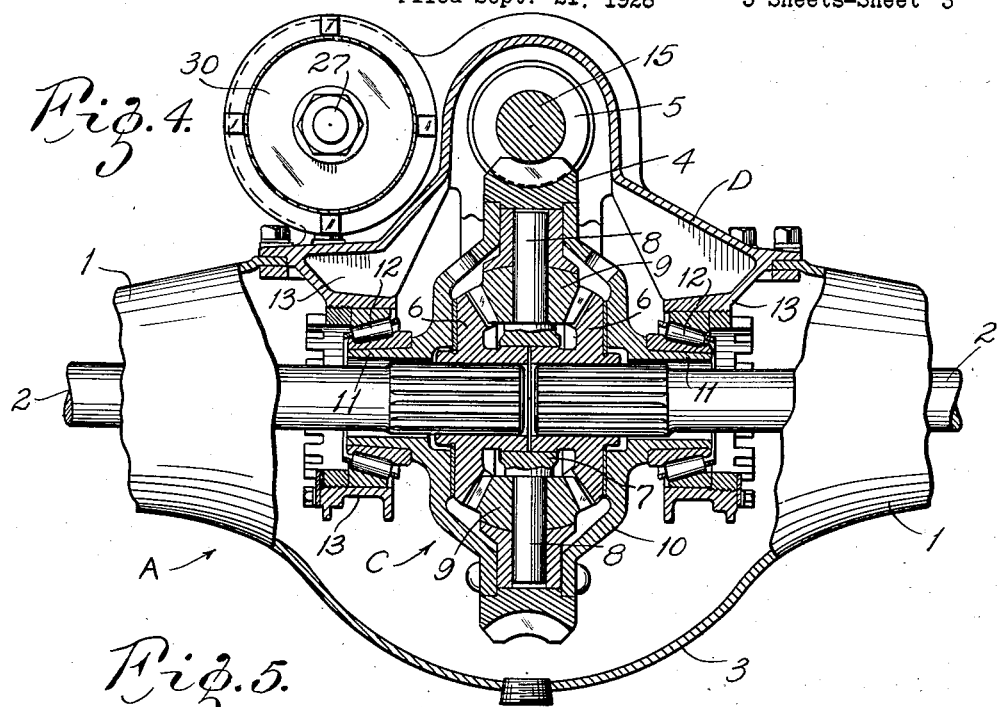
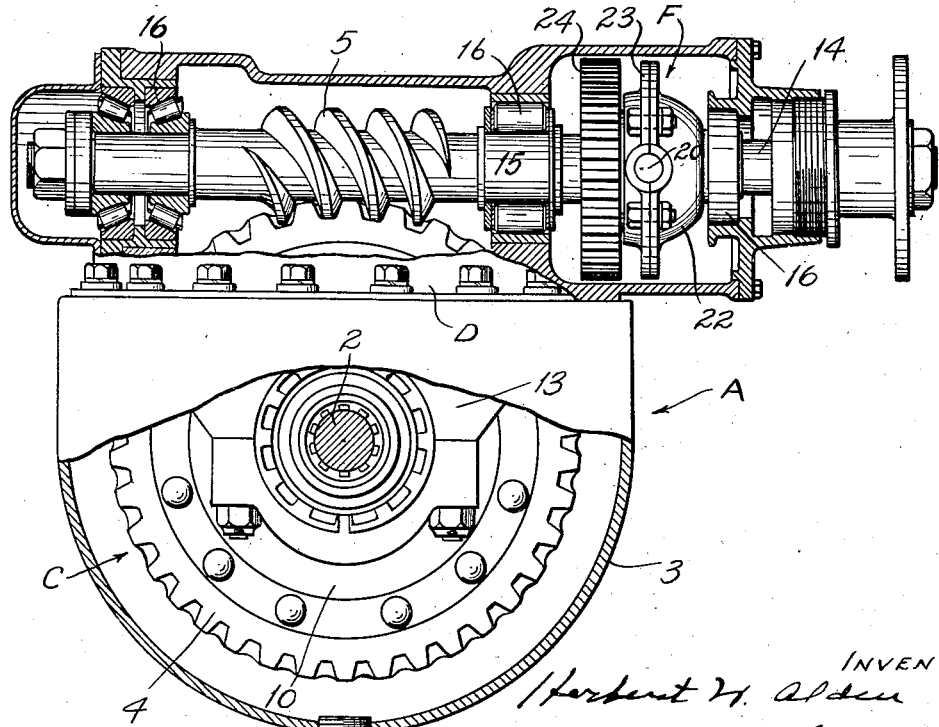
INVENTOR:
Herbert W. Alden
HIS ATTORNEYS.

Patented Feb. 24, 1931

1,794,099

UNITED STATES PATENT OFFICE

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO

MOTOR VEHICLE

Application filed September 21, 1928. Serial No. 307,438.

This invention relates to motor vehicles of the type having two differential driving axles. One of the principal objects of the present invention is to provide differential driving mechanism for the two differential driving axles, thereby equalizing the starting, driving and braking torque on the driving gears of the two axles and permitting the brakes on the wheels of said axles to be adjusted and equalized independently of each other. Another object is to increase the length of the driving shaft connection between the two axles, thereby enabling the universal joints between said driving shaft and the two axles to be spaced farther apart and thus lessen the angle through which the universal joints work. Other objects are simplicity of construction and economy and compactness of design.

The invention consists in the motor vehicle construction and in the arrangements and combinations of parts hereinafter described and claimed.

In the accompanying drawing, which forms part of this specification and wherein like symbols refer to like parts wherever they occur, Fig. 1 is a plan view of the middle portions of the two rear differential driving axles of a motor vehicle provided with a differential driving mechanism embodying my invention;

Fig. 2 is an enlarged plan view of the middle portion of the front axle with the front portion of the worm gear carrier for said axle being shown broken away in horizontal section to disclose the differential driving mechanism for the two axles;

Fig. 3 is a vertical transverse cross-section through the rear axle housing, the section being taken along the worm shaft of the differential gear carrier on the line 3—3 in Fig. 1;

Fig. 4 is a similar section through the front axle housing on the line 4—4 in Fig. 1; and Fig. 5 is a vertical longitudinal section through the front axle on the line 5—5 in Fig. 1.

In the accompanying drawings, my invention is shown in connection with the two rear differential driving axles A and B, respectively, of a six-wheeled motor vehicle. Each of said driving axles comprises an axle casing or housing which has a tubular end portion 1 adapted to receive the driving shaft sections 2, and an enlarged bowl or pot-shaped middle portion 3, forming a chamber adapted to receive a differential mechanism C through an opening located preferably in the top of said chamber. Mounted on the differential mechanism C, and forming part thereof, is a worm gear ring 4 which meshes with a worm 5 located thereabove. Gear carriers D and E are removably secured preferably to the tops of the bowl-shaped middle portions 3 of the axle housings A and B, respectively, and enclose and support differential gearing and the driving gearing therefor, the gear carriers covering the openings in the bowl-shaped middle portions of said housings.

The differential mechanism C for each driving axle comprises two opposed bevel side gears 6 which are splined on the inner ends of the driving shaft sections 2 of the axle. These side gears 6 have hubs extending toward each other and are journaled in a bearing provided therefor in a spider 7. The spider 7 has radially extending stub shafts 8 on which are rotatably mounted bevel pinions 9 that intermesh with the two bevel side gears 6. The spider 7, together with the bevel pinions 9 and side gears 6 of the differential, are enclosed within a housing 10 having axially alined hubs 11 that are adapted to receive the driving shaft sections 2. The hubs of the differential housing 10 are journaled in suitable bearings 12 provided therefor in pedestals 13 depending from the differential gear carrier of each driving axle, whereby the differential gearing and the driving gearing therefor are removable with the carrier as a unit.

As shown in the drawing, the differential gear carrier D for the front driving axle A is provided with two axially alined propeller shaft sections 14 and 15, respectively, which extend transversely of the driving axle sections 2 and are journaled in suitable bearings 16 provided therefor in said carrier. The rear propeller shaft section 15 has the worm 5 formed thereon; and the forward end of the front section 14 projects beyond the carrier and is adapted to be connected with the usual change speed transmission gearing (not shown) to be driven thereby. The adjacent ends of the propeller shaft sections 14 and 15 of the front driving axle A are operatively connected by means of a differential driving mechanism F comprising two opposed bevel side gears 17 and 18, the side gear 17 being journaled on the rear propeller shaft section 15 for rotation thereon, and the side gear 18 being keyed to the front propeller shaft section 14 for rotation therewith. Journaled on the cylindrical hub of the front side gear 18 is a spider 19 having radially extending studs 20 on which are rotatably mounted bevel pinions 21 that intermesh with the opposed two side gears 17 and 18. The front side gear 18 and pinions 21 are housed with a housing formed by bell-shaped flange 22 on the inner end of the outer propeller shaft section 14. The outer ends of the studs 20 of the spider 19 are held in seats provided therefor in the opposing faces of the outer portion of the flange 22 and a retaining ring 23 bolted thereto. The inner side gear 17 has a spur gear ring 24 riveted to a circumferential flange 25 thereof and intermeshing with a spur gear 26 bolted to a collar 27 formed on a stub shaft 28, which extends parallel to the propeller shaft sections 14 and 15 and has its ends journaled in suitable bearings 29 provided therefor in the housing of the gear carrier D. The rear end of the stub shaft 28 extends rearwardly beyond the housing of the gear carrier D and has a suitable universal joint connection 30 with the forward end of a shaft 31 whose rear end has a similar universal joint connection 32 with the forward end of the propeller shaft 33 of the rear driving axle B. The driving worm 5 for the differential gearing of the rear driving axle B is formed on the propeller shaft 33 which is journaled in suitable bearings (not shown) mounted in the housing of the gear carrier E on said rear driving axle.

By the arrangement described, power is transmitted to the two differential driving axles A and B through the differential F located in the gear carrier D of the front driving axle A, whereby the worm drive shafts for the differential mechanism C of the two axles may be differentially driven, thereby equalizing the driving, starting, stopping and braking torque on the driving gearing of said axles and permitting the brakes on the wheels of the two axles to be adjusted independently of each other.

It is noted as an important advantage of my invention that it secures a longer driving shaft between the two driving axles and thus obtains a more efficient universal joint action between said shaft and the propeller shafts of the two axles by decreasing the angle between said drive shaft and said propeller shafts.

Obviously, the invention is not limited to driving axles with worm drive gearing. Likewise, the construction may be changed in detail. Accordingly, I do not wish to be restricted to the details shown and described.

What I claim is:

1. A motor vehicle comprising two differential driving axles, a propeller shaft for the rear axle, propeller shaft sections for the front axle, differential gearing connecting the adjacent ends of the propeller shaft sections of the front axle, a stub shaft journaled on said front driving axle adjacent to the adjacent ends of the propeller shaft sections thereof, a driving shaft connecting said stub shaft of the front axle with the propeller shaft of the rear axle, a gear on said stub shaft, said differential gearing comprising oppositely disposed bevel side gears on the adjacent ends of said propeller shaft sections, one of said side gears being journaled on one of said sections and the other of said side gears being fixed to the other of said sections, a spider journaled on the hub portion of one of said side gears and provided with radially extending studs, bevel pinions journaled on said studs and intermeshing with said bevel side gears, one of said propeller shaft sections having a flanged portion provided with seats for the outer ends of the pinion supporting studs of said spider, a gear secured to the bevel side gear journaled on one of the propeller shaft sections, and a gear fixed to said stub shaft and the gear on the bevel side gear meshing with said gear.

2. A motor vehicle comprising two driving axles, each of said driving axles comprising a housing, driving axle sections mounted in said housing, differential gearing located in said housing and connecting the adjacent ends of the driving axle sections therein, and a carrier removably secured to said housing and supporting said differential gearing, a propeller shaft journaled in a housing provided therefor in the gear carrier for the rear axle, gearing connecting said propeller shaft with the differential mechanism in said rear axle, propeller shaft sections journaled in a housing provided therefor in the gear carrier for the front axle housing, differential gearing housed within the gear carrier for the front axle and connecting the adjacent ends of the propeller shaft sections thereof, a stub shaft housed within the gear carrier for the front axle at one side of the propeller shaft sections thereof, a drive shaft connecting said stub shaft of the gear carrier for the front axle with the propeller shaft of the gear carrier for the rear axle, and gearing connecting the differential gearing for the propeller shaft sections of the gear carrier for the front axle with the stub shaft in said carrier.

3. A differential gear carrier for a differential driving axle of the kind described, said carrier comprising a body portion adapted for attachment to said driving axle, differential gearing supported in said carrier for differentially driving the driving axle sections of said driving axle, propeller shaft sections journaled in said carrier and cooperating with said differential gearing for driving the same, differential gearing connecting the propeller shaft sections of said carrier, a stub shaft journaled on said carrier adjacent to the adjacent ends of the propeller shaft sections thereof, the differential gearing for said propeller shaft sections comprising oppositely disposed bevel side gears mounted therein, one of said side gears being journaled on one of said sections and the other of said side gears being fixed to the other of said sections, a spider journaled on the hub portion of one of said side gears and provided with radially extending studs, bevel pinions journaled on said studs and intermeshing with said bevel side gears, one of said propeller shaft sections having a flanged portion provided with seats for the outer ends of the studs of said spider, a ring gear secured to the bevel side gear journaled on one of the propeller shaft sections, and a gear fixed to said stub shaft and meshing with said ring gear.

4. A motor vehicle comprising two driving axles, a propeller shaft for the rear driving axle, alined propeller shaft sections for the front driving axle one of which is connected to a source of power and the other to said front driving axle to drive the same, a differential mechanism connecting the propeller shaft sections of said front driving axle, a stub shaft substantially parallel with the axis of said differential mechanism and mounted on said front axle forward of the axis thereof and alongside of and operatively connected to said differential driving mechanism to be driven thereby, and a drive shaft extending from the stub shaft on the forward axle to the propeller shaft on the rear axle and having universal joint connections therewith, the universal joint connection between said drive shaft and said stub shaft being substantially as far forward as the axis of the front axle.

5. A motor vehicle comprising two differential driving axles, a propeller shaft for the rear driving axle, alined propeller shaft sections for the front driving axle one of which is connected to a source of driving power, a differential mechanism connecting said propeller shaft sections, a stub shaft journaled on said front axle at one side of the propeller shaft sections thereof and substantially parallel with the axis of the differential mechanism, a driving shaft connecting the stub shaft on the front axle with the propeller shaft of the rear axle, and driving gearing between the differential mechanism for the propeller shaft sections of the front axle and the stub shaft thereof, the point of connection between said stub shaft and said rear axle propeller shaft being substantially as far forward as the axis of the front axle.

6. A motor vehicle comprising two differential driving axles, a propeller shaft for the rear driving axle, alined propeller shaft sections for the front driving axle of which the forward section is connected to a source of driving power, a differential mechanism connecting said propeller shaft sections of said front axle, a stub shaft journaled on the front axle adjacent to and parallel with the propeller shaft sections thereof, a driving shaft having universal joint connections with the stub shaft of the front axle and the propeller shaft of the rear axle, and driving gearing between the differential mechanism for the propeller shaft sections of the front axle and the stub shaft thereof, the point of connection between said stub shaft and said rear axle propeller shaft being substantially as far forward as the axis of the front axle.

7. A motor vehicle comprising two differential driving axles, a propeller shaft for the rear axle, alined propeller shaft sections for the front axle of which the forward section is connected to a source of driving power, differential gearing connecting the adjacent ends of said driving shaft sections of the front axle, a stub shaft journaled on said front driving axle adjacent to the adjacent ends of the propeller shaft sections thereof, a driving shaft connecting said stub shaft of the front axle with the propeller shaft of the rear axle, and a gear on said stub shaft meshing with and driven by a gear on the differential gearing for the propeller shaft sections of the front axle, the point of connection between said stub shaft and said rear axle propeller shaft being substantially as far forward as the axis of the front axle.

8. A differential gear carrier for a differential driving axle of the kind described, said carrier comprising a portion adapted to be attached to the axle casing, differential gearing for said driving axle, pedestals for supporting said differential gearing, and a housing, axially alined propeller shaft sections journaled in the carrier housing for driving said differential gearing, one of which is connected to said differential gearing to drive the same, differential mechanism located in the carrier housing and connecting the adjacent ends of said propeller shaft sections, a stub shaft entirely forward of the axis of said first mentioned differential gearing journaled in said carrier housing adjacent to said propeller shaft sections, and a driving connection between said stub shaft and the differential mechanism for said propeller shaft sections, whereby said stub shaft is driven by said differential gearing.

9. A worm drive motor vehicle comprising two differential driving axles, a worm propeller shaft for the rear axle, alined propeller shaft sections for the front axle of which the forward section is connected to a source of driving power and the rear section has a driving worm adapted to drive the differential mechanism of the front axle, differential gearing connecting the adjacent ends of the driving shaft sections of the front axle, a stub shaft journaled on top of the forward portion of said front driving axle adjacent to the adjacent ends of the propeller shaft sections thereof, a driving shaft connecting said stub shaft at a point forward of the axis of the front axle with the propeller shaft of the rear axle, and a gear on said stub shaft meshing with and driven by a gear of the differential gearing for the propeller shaft sections of the front axle.

10. A motor vehicle comprising two driving axles, a propeller shaft for the front driving axle, a propeller shaft for the rear driving axle, a stub shaft journaled on the front axle alongside of and operatively connected to the front axle propeller shaft, and a relatively long rigid driving shaft operatively connected with the stub shaft of the front axle and the propeller shaft of the rear axle, the point of connection between said stub shaft and said driving shaft being substantially as far forward as the axis of the front axle.

11. A motor vehicle comprising two driving axles, a propeller shaft for the front driving axle, a propeller shaft for the rear driving axle, a stub shaft journaled on the front axle alongside of and operatively connected to the front axle propeller shaft, and a relatively long rigid driving shaft operatively connected with the stub shaft of the front axle and the propeller shaft of the rear axle, the point of connection between said stub shaft and said driving shaft being substantially as far forward as the axis of the front axle, and the point of connection between the rear axle propeller shaft and said driving shaft being adjacent to and immediately in front of the rear axle.

Signed at Detroit, Michigan, this 17th day of September, 1928.

HERBERT W. ALDEN.